(12) United States Patent
Tasch et al.

(10) Patent No.: US 6,459,183 B1
(45) Date of Patent: Oct. 1, 2002

(54) ELECTROMOTIVE DRIVE SYSTEM, ESPECIALLY A POWER WINDOW DRIVE SYSTEM FOR A MOTOR VEHICLE

(75) Inventors: Franz Tasch, Rheinstetten; Matthias Weber, Baden-Baden; Bruno Droll, Buehl-Altschweier; Walter Haussecker, Buehlertal; Martin Karl, Sasbachwalden; Robert Hessdoerfer, Karlstadt-Stetten; Friedrich-Wilhelm Dreier, Sinzheim; Rainer Kurzmann, Achern, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/719,366

(22) PCT Filed: Dec. 24, 1999

(86) PCT No.: PCT/DE99/04059

§ 371 (c)(1),
(2), (4) Date: Feb. 1, 2001

(87) PCT Pub. No.: WO00/63515

PCT Pub. Date: Oct. 26, 2000

(30) Foreign Application Priority Data

Apr. 15, 1999 (DE) .......................................... 199 16 958

(51) Int. Cl.$^7$ .............................................. H02K 11/00
(52) U.S. Cl. ........................ 310/89; 310/68 R; 310/71; 310/75 R; 310/68 B
(58) Field of Search ................................ 310/68 B, 89, 310/75 R, 67 R, 68 R, 71

(56) References Cited

U.S. PATENT DOCUMENTS

| | | | |
|---|---|---|---|
| 4,030,750 A | 6/1977 | Abram | 297/375 |
| 4,401,343 A | 8/1983 | Schmidt | 297/284.1 |
| 5,171,062 A | 12/1992 | Courtois | 297/340 |
| 5,245,258 A | * 9/1993 | Becker et al. | 310/68 B |
| 5,513,897 A | 5/1996 | Lemmen | 297/410 |

FOREIGN PATENT DOCUMENTS

| | | |
|---|---|---|
| DE | 42 48 849 C | 10/1993 |
| DE | 196 49 587 A | 6/1998 |
| DE | 197 26 800 A | 1/1999 |
| EP | 0 205 409 A | 12/1986 |

* cited by examiner

Primary Examiner—Burton S. Mullins
(74) Attorney, Agent, or Firm—Michael J. Striker

(57) ABSTRACT

An electric motor drive mechanism, in particular a window control drive mechanism for a motor vehicle, has an electric motor (10), which has a motor armature shaft (12) that is operatively connected to a gear unit (14) surrounded by a gear housing (16), and also has a motor electronics unit (18) surrounded by an electronic housing (20). The electronics housing (20) has a guide rail (22), extending radially to the motor armature shaft (12), for insertion of the electronics housing (20) via a counterpart guide (23) disposed on the gear housing (16).

9 Claims, 3 Drawing Sheets

Figure 1:
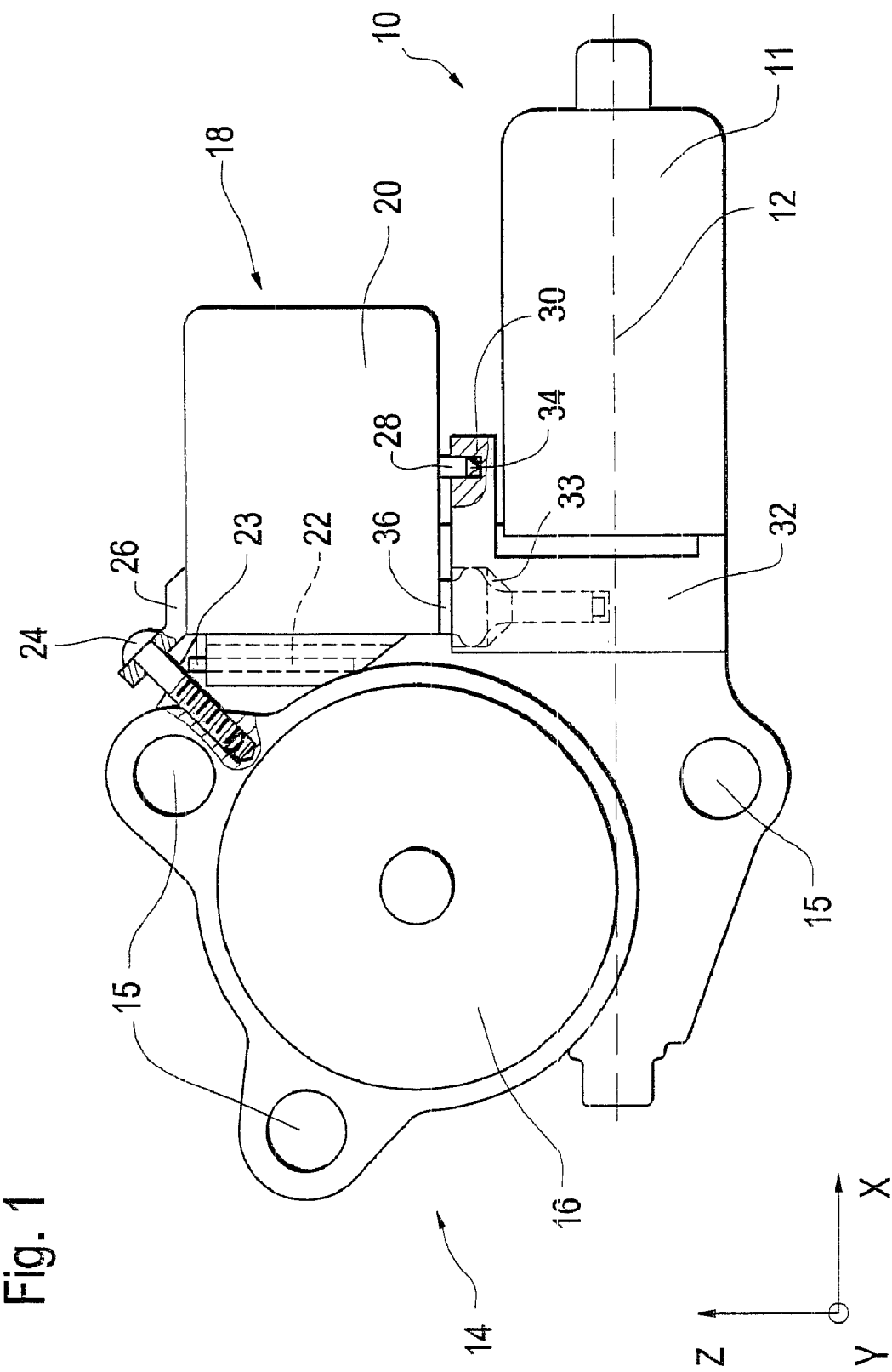

ELECTROMOTIVE DRIVE SYSTEM, ESPECIALLY A POWER WINDOW DRIVE SYSTEM FOR A MOTOR VEHICLE

PRIOR ART

The invention relates to an electric motor drive mechanism, in particular a window control drive mechanism for a motor vehicle. Electric motor drive mechanisms are widely known and can be used especially in the automotive field for adjusting manifold vehicle components. This applies for instance to adjusting vehicle seats, windows and sun roofs, or also to adjusting mirrors. The drive mechanisms employed as a rule have an electric motor and a gear following it, as well as an electronic control and supply unit. This electronic unit is constructed on a circuit board that is accommodated in an electronics housing.

To determine position parameters of the actuating drive, sensor devices that are disposed on a sensor prong are typically used. These sensor devices interact with the rotating motor armature shaft and count the revolutions of the shaft. For this purpose, it is necessary that the sensor prong and the electronics connected to it be positionable as precisely as possible and fixable as securely as possible.

These two requirements make for a considerable outlay for assembly of the electronics, since by the previous assembly technology all the electronics along with the sensor device, and optionally in the brush holder, are screwed or clipped to the gear housing. The electronic unit is open toward the gear, so that in addition to the problem of positioning and fixation, a sealing problem arises.

ADVANTAGES OF THE INVENTION

The electric motor drive mechanism according to the invention has the advantage that the electronics housing can be connected to the drive mechanism securely and largely without play; the assembly is simplified substantially because the electronics housing need merely be slipped onto the guide rail of the gear housing, and exact positioning of the sensor device connected to the electronic unit, for determining position parameters of the drive mechanism, is made possible.

Advantageous refinements of the electric motor drive mechanism are possible.

For instance, it is advantageous if the guide rail, which is disposed either on the electronics housing or on the gear housing, extends substantially over the width of the electronics housing. As a result, binding of the electronics housing to the drive mechanism occurs over the maximum possible length; the electronic unit is optimally fixed, and a sensor prong attached to it can be positioned with high precision.

It is highly advantageous if the guide rail is embodied in rectangular shape. As a result, an ideal positive engagement with the counterpart guide and high strength of the electronics housing, both in the direction parallel to the motor armature shaft and in the radial direction, are achieved.

Along with this optimal guidance, which makes close production tolerances possible, assembly of the electronic unit is facilitated considerably, since it need merely be inserted into the drive mechanism via this guide mechanism.

A further advantage is that the electronics housing is already guided before the sensor prong dips into the recess of the brush holder. This additionally facilitates assembly of the electronic unit, and at the same time the risk of damage to the sensor device is minimized.

In a further advantageous feature of the electric motor drive mechanism, the guide rail has at least one central indentation, extending along the guide rail, in which indentation an also central, longitudinally extending protuberance of the counterpart guide is guided. This feature increases the precision of the guidance still further.

It is also advantageous if the inserted electronics housing can be secured with a securing means, in particular in the form of a screw. This is preferably disposed on the end of the guide rail remote from the motor armature shaft, at an angle of approximately 45° to the motor armature shaft. As a result, not only can the play in the radial direction to the motor armature shaft axis be minimized—as in conventionally. disposed securing means at an angle of 90° to the motor armature shaft—in addition to the fixation in this radial direction, but at the same time a play-free fastening in the axial direction is made possible.

A further feature of the invention provides that the electronics housing is braced, opposite a pole pot of the electric motor, with a support pin disposed on the electronics housing. This support pin is received by a recess that is disposed in the brush holder, for instance, and offers an additional bracing option for the electronics housing. It therefore relieves the guide mechanism and furthermore minimizes the introduction of force into the sensor prong.

If this support pin has a chamfer, then the precise introduction of the support pin into the recess is facilitated.

A quite general advantage of the electric motor drive mechanism according to the invention is that the electronic unit is a completely separate part, which can be slipped onto various drive mechanisms universally. Because of the advantageous guide mechanism, a high degree of flexibility is achieved, since drive mechanisms and electronic units of the most various types can be combined with one another in a fundamentally arbitrary way. At little engineering effort or expense, along with substantially simpler assembly, better fixation of the electronics housing to the drive mechanism and a substantially more-precise positioning of the sensor prong, attached to the electronics housing, to the armature shaft of the drive mechanism are achieved.

DRAWINGS

In the drawing, one exemplary embodiment of an electric motor drive mechanism according to the invention is shown, and it is described in further detail in the ensuing description.

Figure 2:
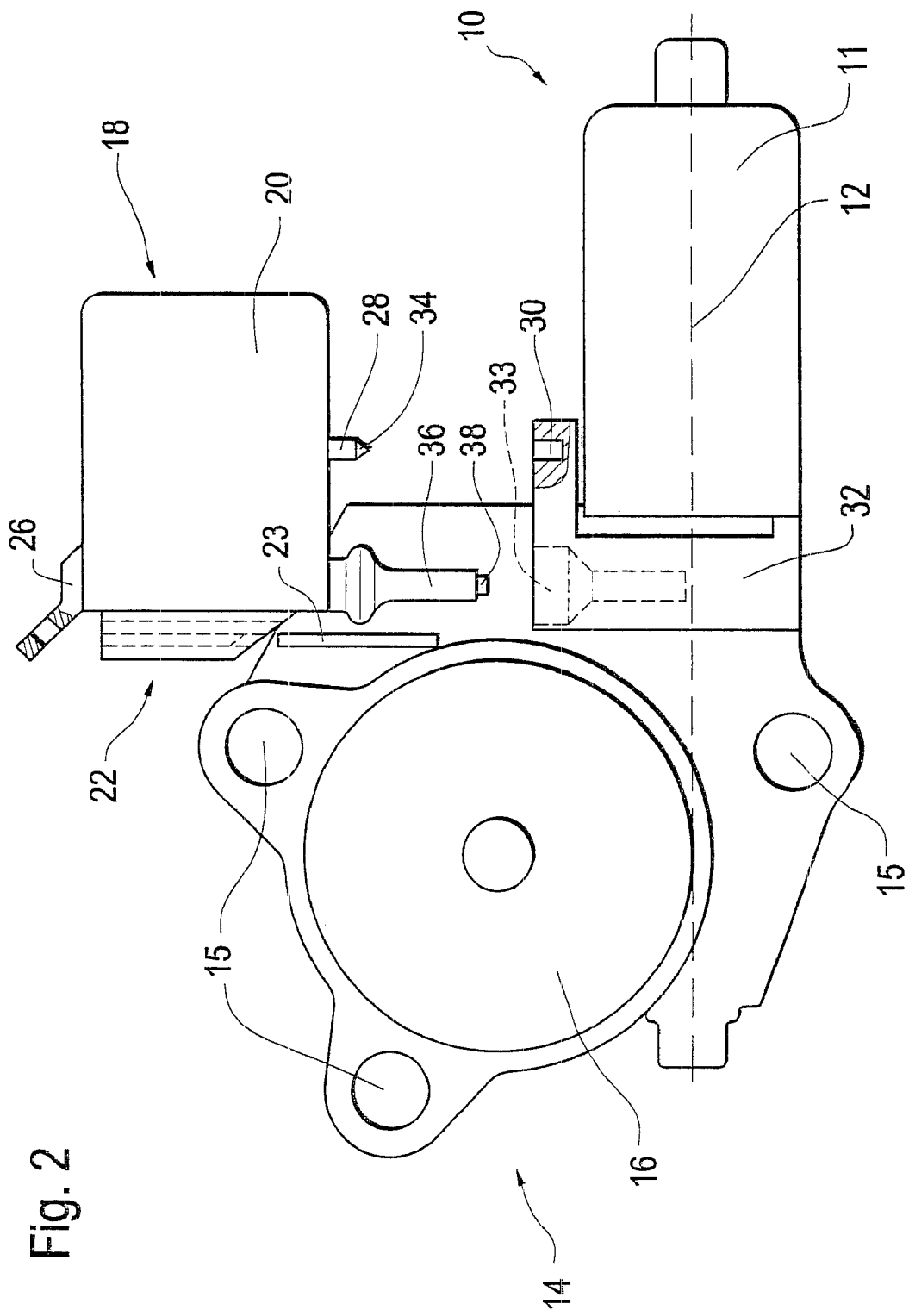
Figure 3:
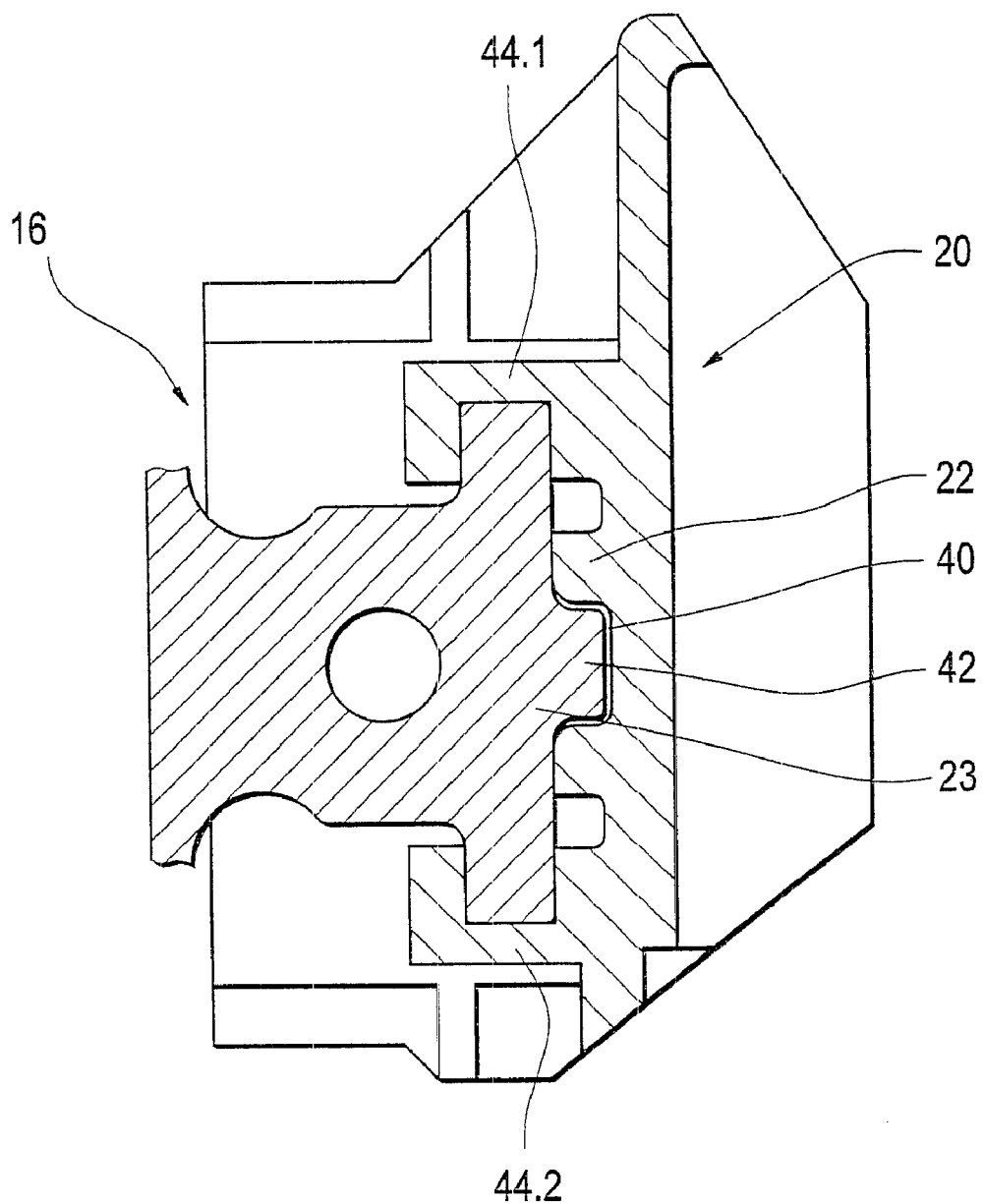

Shown are:

FIG. 1, a schematic illustration of a fully assembled electric motor drive mechanism;

FIG. 2, the drive mechanism of FIG. 1 with the electronic unit not yet mounted; and FIG. 3, a section taken along the line I—I of FIG.

DESCRIPTION OF THE EXEMPLARY EMBODIMENT

The exemplary embodiment shown in FIG. 1 has an electric motor drive mechanism according to the invention, in particular a window control drive mechanism for a motor vehicle, with an electric motor 10 that is surrounded by a pole pot 11 and that has a motor armature shaft 12. The motor armature shaft 12 is represented only symbolically by a dashed line that indicates its course. The drive mechanism further includes a gear unit 14, which is surrounded by a gear housing 16 and is provided with three bores 15 for mounting purposes. The electric motor 10 is operatively connected to the gear unit 14 via the motor armature shaft 12.

For supply and control of the electric motor drive mechanism, a motor electronics unit 18 is provided, which is accommodated in an electronics housing 20.

The electronics housing 20 is solidly joined to the gear housing 16 via a guide mechanism 22, 23 and is fixed in its position with a securing means 24 in the form of a screw. The securing means 24 is screwed into the gear housing 16 at an angle of 45° to the axis of the motor armature shaft, on the end of the guide mechanism 22, 23 remote from the drive mechanism. For connection to the electronics housing 20, the securing means also passes through a connecting part 26 and thus secures the electronics housing 20.

A support pin on the side of the electronics housing 20 toward the pole pot 11 assures additional bracing of the electronic unit 18 relative to the pole pot 11. This support pin 28 protrudes into a recess 30 of the brush holder 32, and thus additional forces in the Z and Y directions shown are absorbed.

The support pin 28 has a chamfer 34, which makes it easier to introduce the support pin 28 into a recess 30 of the brush holder 32.

Also shown is a sensor prong 36, which protrudes into a second recess 33 of the brush holder 32. A sensor device 38 shown in FIG. 2 is disposed on this sensor prong 36 and serves to ascertain position data of the motor.

FIG. 2 shows the exemplary embodiment of FIG. 1, but here the electronic unit 18 is not mounted. This makes it possible to show and describe the guide mechanism 22, 23 and the sensor. device 38 in greater detail.

In FIG. 2 as in the following figures, the same characteristics are identified by the same reference numerals.

The exemplary embodiment as shown in FIG. 2 explicitly shows the guide mechanism 22, 23, with which the motor electronics unit 18 is slipped onto the drive mechanism. It comprises a guide rail 22, which is disposed on the electronics housing 20, as well as a counterpart guide 23, which is disposed on the gear housing 16. The guide rail 22 and the counterpart guide 23 are adapted to one another in shape and enable both exact guidance and secure fixation of the electronics housing 20.

Also visible in FIG. 2 is the sensor prong 36, which on its free end is provided with a sensor device, which in this exemplary embodiment is embodied as a Hall IC. In the mounted state, this Hall IC interacts with a ring magnet, not shown, that is mounted on the motor armature shaft 12. This interaction furnishes position signals for determining the position of the armature shaft 12, or of the adjustable part connected to the drive mechanism.

FIG. 3 shows the geometric shape of the guide mechanism comprising the guide rail 22 and counterpart guide 23. The guide rail 22 is embodied in rectangular form; it has two L-shaped struts 44.1 and 44.2, which partly embrace the counterpart guide of the gear housing 16. Optimal positive engagement is assured whenever—as shown in the exemplary embodiment—the counterpart guide 23 is embodied substantially in the form of a T. Then the electronics housing 20 connected to the guide rail 23 is ideally braced both in the X direction shown and in the Y direction.

The bracing and strength of the electronics housing 20 are additionally enhanced by an indentation 40 in the guide rail 22, into which indentation a protuberance 412 of the counterpart guide 23 protrudes.

Independently of the exemplary embodiment described, fundamentally other geometric shapes are also conceivable for the guide mechanism according to the invention; the sole decisive factors are the secure guidance of the electronics housing 20 and its optimal attachment to the electric motor drive mechanism, along with the most precise possible positionability of the sensor device 38.

What is claimed is:

1. An electric motor drive mechanism, in particular a window control drive mechanism for a motor vehicle, comprising an electric motor (10) having a motor armature shaft (12), wherein said motor armature shaft (12) is operatively connected to a gear unit (14), said gear unit (14) surrounded by a gear housing (16), said electric motor drive mechanism further comprising a motor electronics unit (18), said motor electronics unit surrounded by a separable electronics housing (20), wherein the electronics housing (20) has a guide rail (22), said guide rail (22) extending perpendicularly to the motor armature shaft (12), said gear housing having a counterpart guide for insertion of the electronics housing (20).

2. The electric motor drive mechanism of claim 1, wherein the guide rail (22) and the counterpart guide (23) extend over the width of the electronics housing (20).

3. The electric motor drive mechanism of claim 1, wherein the guide rail (22) has a rectangular shape.

4. The electric motor drive mechanism of claim 1, wherein the guide rail (22) has at least one central indentation (40), extending along the guide rail (22), wherein said counterpart guide has a central, longitudinally extending protuberance (42), and wherein said central, longitudinally extending protuberance (42) is guided In said at least one central indentation (40).

5. The electric motor drive mechanism of claim 1, wherein the inserted electronics housing (20) is secured with a securing means (24).

6. The electric motor drive mechanism of claim 5, wherein the securing means is disposed on an end of the guide rail (22) remote from the motor armature shaft (12), at an angle of approximately 45° to the motor armature shaft (12).

7. The electric drive mechanism of claim 1, wherein the electronics housing has a support pin and wherein said electric motor (10) has a pole pot (11), and wherein the electronics housing (20) is braced opposite the pole pot (11) with the support pin (28).

8. The electric motor drive mechanism of claim 7, further comprising a brush holder (32) having a recess, and wherein the support pin (28) protrudes into the recess (30) of the brush holder (32).

9. The electric motor drive mechanism of claim 8, wherein the support pin (28) has a chamfer (34).

* * * * *